TEN KEY DIFFERENTIAL ENTRY MECHANISM

Filed June 14, 1946 6 Sheets-Sheet 1

INVENTOR.

Aug. 26, 1952 G. W. HOPKINS 2,608,346

TEN KEY DIFFERENTIAL ENTRY MECHANISM

Filed June 14, 1946 6 Sheets-Sheet 2

INVENTOR.

Aug. 26, 1952 G. W. HOPKINS 2,608,346

TEN KEY DIFFERENTIAL ENTRY MECHANISM

Filed June 14, 1946 6 Sheets-Sheet 3

INVENTOR.

Aug. 26, 1952 G. W. HOPKINS 2,608,346

TEN KEY DIFFERENTIAL ENTRY MECHANISM

Filed June 14, 1946 6 Sheets-Sheet 4

INVENTOR.

INVENTOR.

Aug. 26, 1952 G. W. HOPKINS 2,608,346

TEN KEY DIFFERENTIAL ENTRY MECHANISM

Filed June 14, 1946 6 Sheets-Sheet 6

INVENTOR.

Patented Aug. 26, 1952

2,608,346

UNITED STATES PATENT OFFICE 2,608,346

TEN KEY DIFFERENTIAL ENTRY MECHANISM

George W. Hopkins, San Leandro, Calif., assignor to Friden Calculating Machine Co., Inc., a corporation of California Application June 14, 1946, Serial No. 676,677

16 Claims. (Cl. 235—61)

This invention relates to calculating machines.

The object of the invention is to provide a calculating machine in which most of the operations are performed by electrical means.

Another object of the invention is to provide means for magnetically recording the value set up by the keyboard which can subsequently be utilized for causing registration in the accumulator.

Other objects will be evident after the following disclosure in which.

Figure 1:
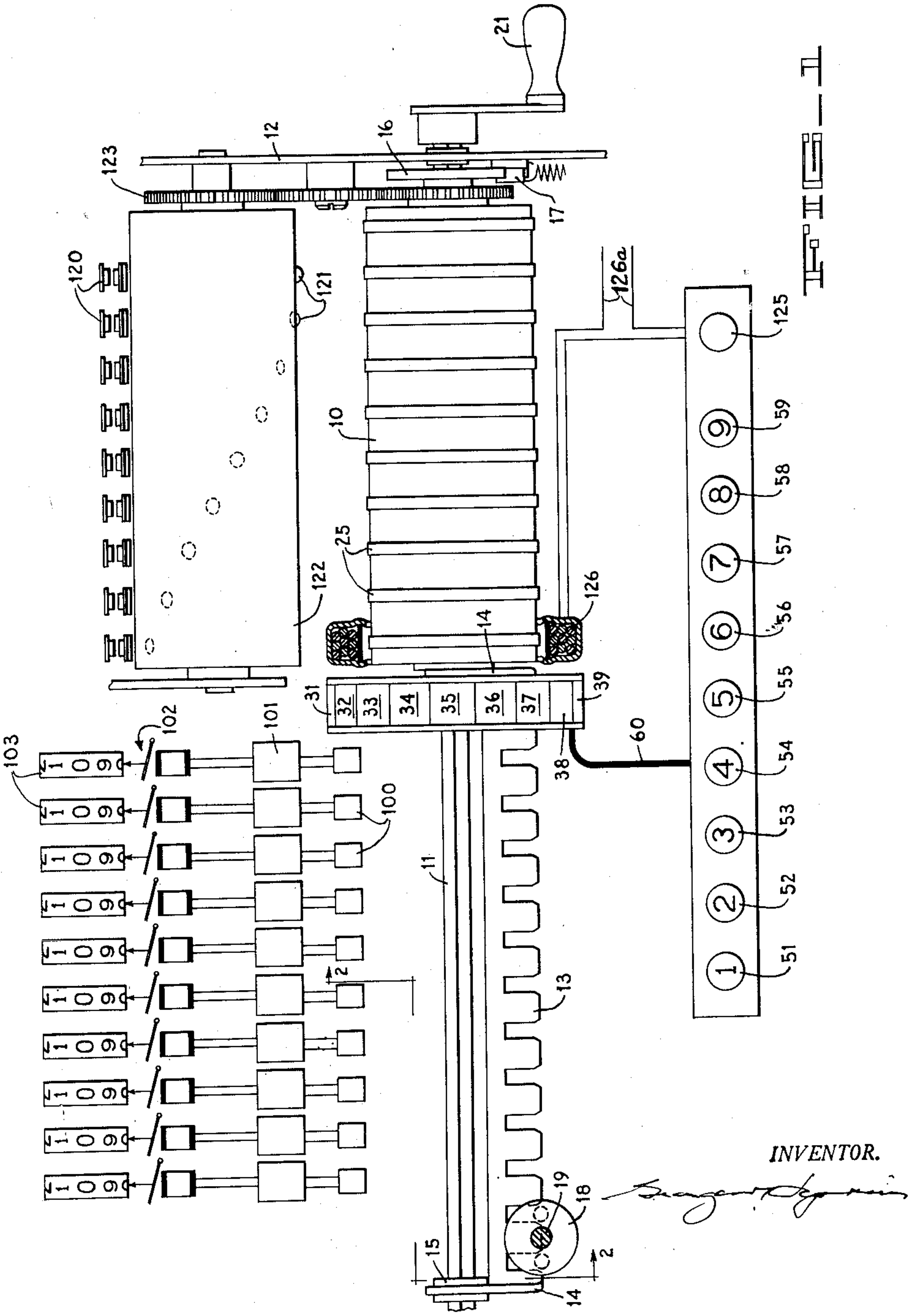
Figure 1 is a diagrammatic showing of the machine.
Figure 2:
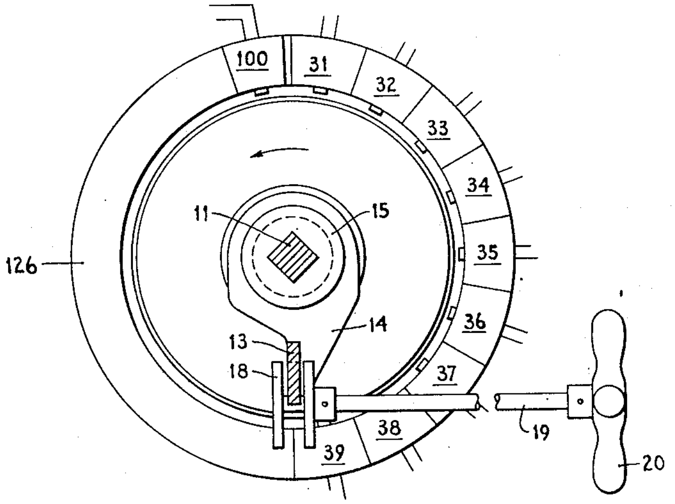
Figure 2 is a section taken on the line 2—2 in Figure 1.

In Figure 1 a drum 10 is mounted on a square shaft 11 which is suitably supported in a frame work, part of which is indicated at 12. The drum 10 is slidable on the shaft 11 and rotatable therewith. In order to slide the drum 10 along the shaft 11 a rack 13 is provided which has hangers 14, engaging grooved collars 15 (Fig. 2). A pin wheel 18 on a shaft 19 having a handle 20 engages the rack 13 and when rotated serves to move the rack and the drum along the shaft 11. Crank 21 secured to the end of the shaft 11 is utilized to rotate the drum 10. This rotation, however, is not imparted to the rack 13. The shaft 11 is secured to a cam 16 (also see Fig. 7) which has a spring-pressed follower 17 that serves as a centralizer to determine the full cycle position of the shaft 11.

The record-receiving member comprises the drum 10 and, secured thereto, a plurality of record-receiving tapes or wires 25 which are of suitable material for magnetic recording. While I have referred to the magnetic recording material as being in the form of a tape or wire I wish it to be understood that this member of the mechanism may take any convenient form such as, for example, a disc or gear as will presently be apparent. In the embodiment shown, the body of the drum 10 is preferably of non-magnetic material. As shown in Figure 1 the parts are in the original position prior to the set-up of a value in the drum and this is accomplished as will now be described.

Figure 3:
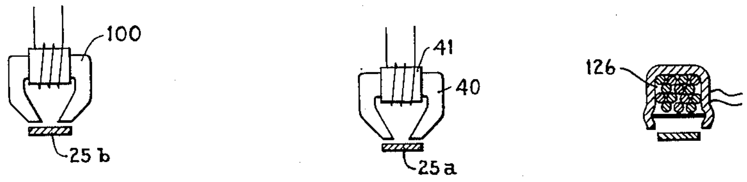
Figure 3 is a diagrammatic showing of certain elements of the machine.
Figure 4:
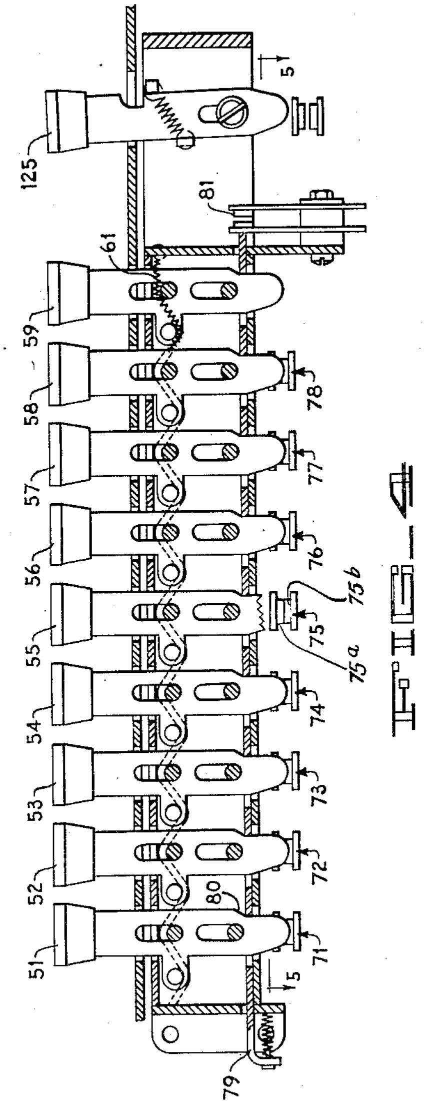
Figure 4 is a view of the keyboard.
Figure 5:
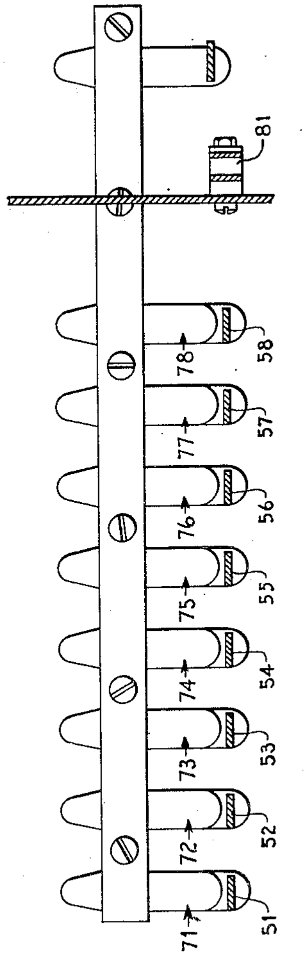
Figure 5 is a section taken on the line 5—5 in Figure 4.

A series of nine electro-magnets 31–39 (Figs. 1 and 2) are arranged annularly in an arc concentric with the shaft 11 and drum 10. One of these electro-magnets is shown in detail in Figure 3 where it will be seen that it comprises a pole piece 40 having a winding 41. The construction of the electro-magnets 31–39 is substantially identical. Energization of the electro-magnets 31–39 is controlled by nine keys 51–59, the wires leading from the keyboard to the electro-magnets are shown as being enclosed in a conduit indicated at 60. Referring to Figures 4 and 5, the keys 51–59 are suitably mounted for vertical sliding movement and are normally urged upwardly by a spring 61. Keys 51–58 have associated therewith normally closed switches 71–78. Switch 75 is shown as comprising blades equipped respectively with normally engaged contact points $75^a$ and $75^b$. Switches 71 to 74, and 76 to 78 are similar to switch 75. Depression of a selected one of the keys 51–58 will open the corresponding switch. The stems of the keys pass through slots in a slide 79 spring-urged to the left. The key stems are similar in conformation and each has a cam face 80 which, upon depression of the selected key urges the slide 79 to the right (Fig. 4). This movement of the slide causes closure of a switch 81.

Figure 6:
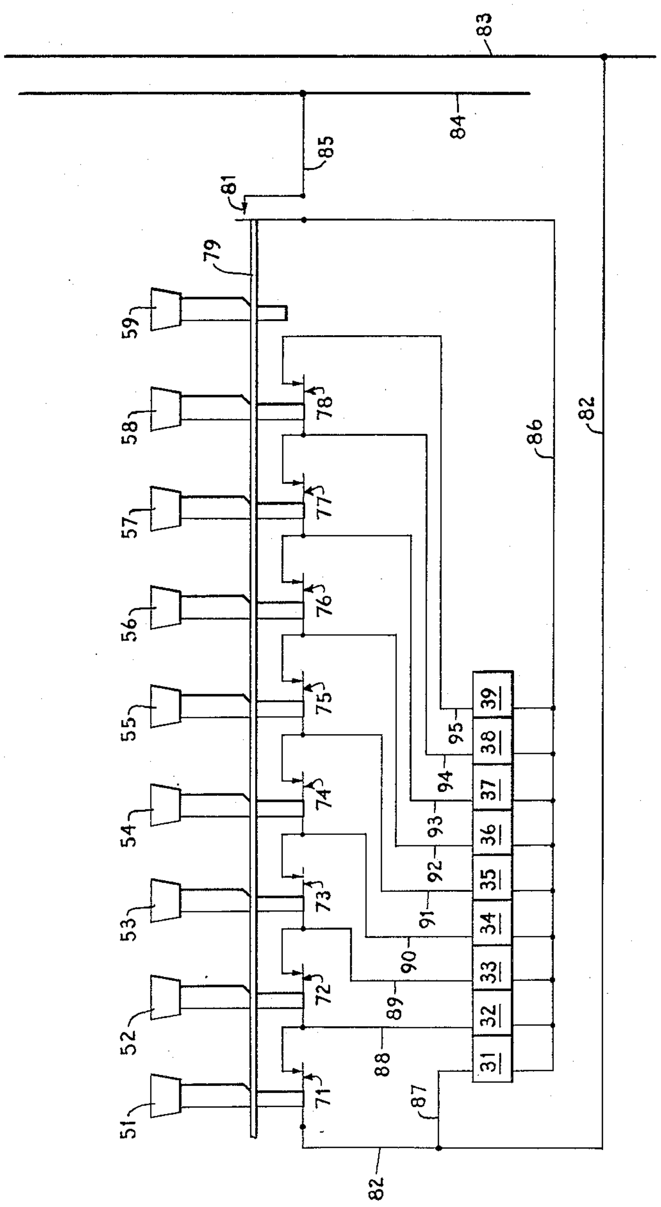
Figure 6 is a wiring diagram showing the circuits controlled by the keys of the keyboard.

Referring to Figure 6, the electrical connections of the elements just described will now be explained. The switches 71–78 are connected in series and the switch 71 is connected by a line 82 to one side 83 of a D. C. power supply. The other side of the power supply 84 is connected by a line 85 to one side of the switch 81, the other side of which is connected to a line 86 common to the nine electro-magnets 31–39. A line 87 connects the electro-magnet 31 to the line 82. A line 88 connects the electro-magnet 32 to the switch 71. A line 89 connects the electro-magnet 33 to the switch 72. A line 90 connects the electro-magnet 34 to the switch 73. A line 91 connects the electro-magnet 35 to the switch 74. A line 92 connects the electro-magnet 36 to the switch 75. A line 93 connects the electro-magnet 37 to the switch 76. A line 94 connects the electro-magnet 38 to the switch 77. A line 95 connects the electro-magnet 39 to the switch 78.

Depression of a selected key will cause energization of a number of the electro-magnets corresponding to the number of the key. For example, when the number "1" key 51 is depressed it opens the switch 71 and closes the switch 81. This will energize the electro-magnet 31 by establishing a circuit from the power supply line 83 through the line 82, the line 87, to the electro-magnet 31 and then back through the line 86, the switch 81, and the line 85 to the other side of a power supply 84. None of the other electro-magnets 32–39 will be energized because of the opening of the switch 71. Depression of the number "2" key 52 will open the switch 72 and close the switch 81. This will establish a circuit from one side of the power supply 83 through the line 82 and the line 87 to the electro-magnet 31 and also through the switch 71 and the line 88 to the electro-magnet 32. The other sides of the electro-magnets 31 and 32 are connected to the line 86 which is connected through the switch 81 and the line 85 to the other side of the power supply 84. Depression of the number 9 key 59 causes closure of the switch 81 and as will be evident, energization of all nine magnets 31–39 results. Thus, it will be seen that depression of a selected numeral key results in energization of a number of electro-magnets corresponding to the number of the key.

In order to set-up a number in the drum 10 (Fig. 1) the operator rotates the pin wheel 18 to shift the drum to the left in order to bring the first magnetic recording tape 25 between the poles of the bank of electro-magnets. This position is indicated in Figure 3 as 25*a*. The operator then depresses the selected numeral key, for example, the number 4 key, and this causes energization of four electro-magnets 31–34 (Figs. 2 and 6). Each of these four electro-magnets magnetizes a portion of the tape 25 so that as a result four peripherally spaced points on the tape 25 will be magnetized. Upon release of the numeral key the electro-magnets will de-energize, but the four points on the tape remain magnetized. The operator now shifts the drum 10 one place to the left in order to set-up the next figure and proceeds in the manner just described, and if, for example, he depresses the 6 key the second magnetic recording tape 25 will have six points on it magnetized. In this manner the operator proceeds to set the value in the drum 10.

After the last digit of the value has been set in the drum 10 the pin wheel 18 is given one more rotation in order to dispose the tape in which the last digit value has been set in alignment with the units order of the accumulator, it being understood that the other figures are ordinarily disposed with respect to the accumulator as in the conventional manner of a ten-key adding machine. However, in accordance with this invention, the accumulator is actuated electrically. As shown in Figure 1 each order of the accumulator comprises a pick-up coil 100 connected to an electric amplifier 101 which is connected to a magnetic stepping device 102 which actuates the numeral wheel 103. The pick-up coil 100 as shown in Figure 3 is constructed in substantially the same way as the electro-magnet previously described and the tape is indicated at the position 25*b*. In order to enter the value in the accumulator the operator rotates the crank 21 and as each magnetized point on the tapes 25 passes the poles of its associated pick-up coil 100 current is induced in the pick-up coil so that, for example, if the number set up is 46, and the crank 21 is rotated one revolution the pick-up coil 100 in the units order of the accumulator will have six pulses of current induced in it while that in the tens order will have four pulses induced. These pulses are then amplified by a conventional electronic amplifier, if necessary. If a current of sufficient strength is induced in the pick-up coil then, of course, no amplification will be required. Amplifiers suitable for this purpose will be described later. The amplified pulses are transmitted to the stepping devices 102.

Figure 7:
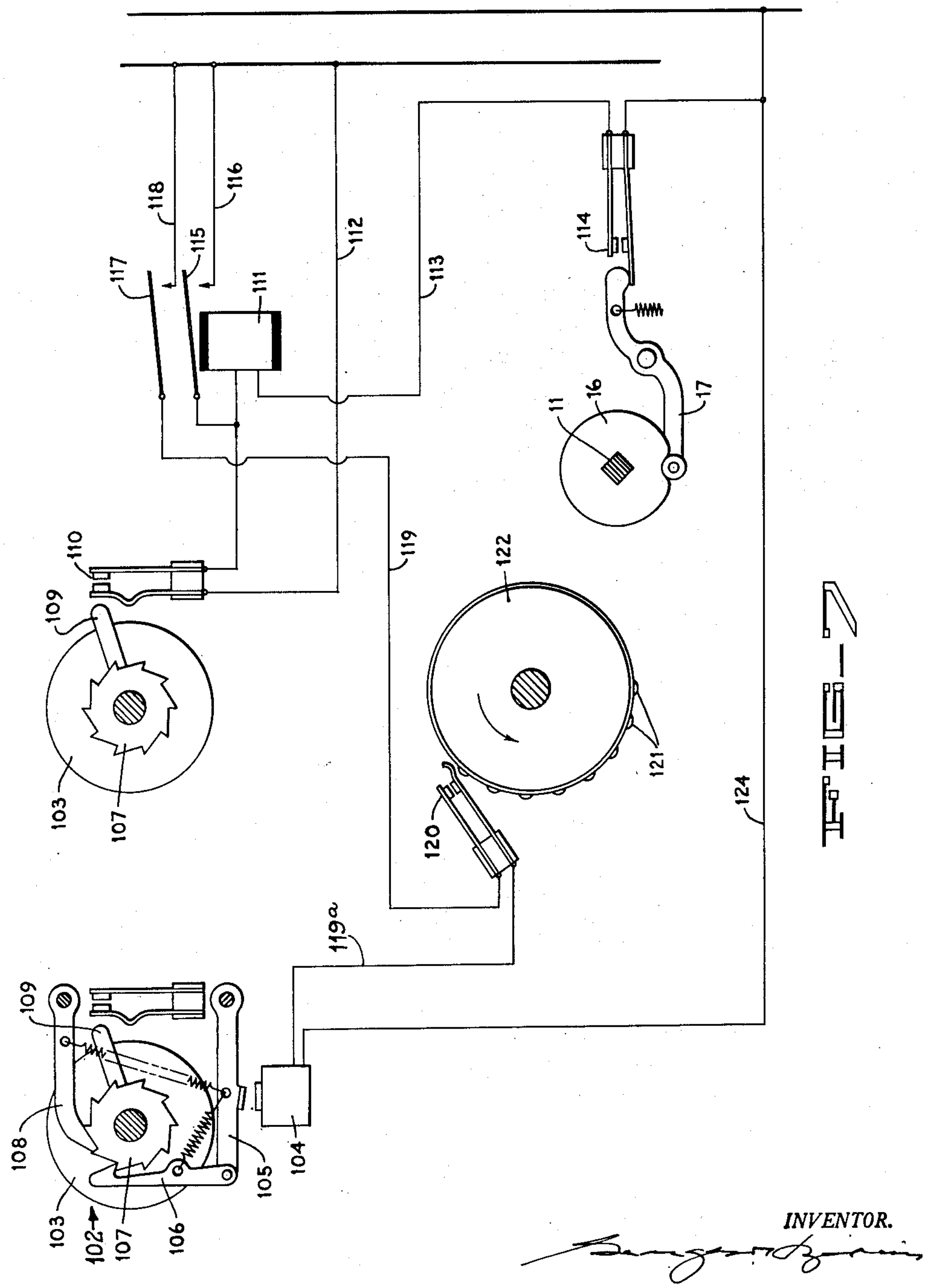
Figure 7 shows the means for actuating the numeral wheels and also the electrical transfer mechanism.

Referring to Figure 7, one of the stepping devices is shown in detail as comprising electromagnet 104 which when energized attracts a lever 105 which has pivotally mounted thereon a pawl 106 which engages a ratchet wheel 107 secured to the numeral wheel 103. The ratchet wheel 107 is held against clockwise rotation by a pawl 108. Thus it will be seen that for each pulse received by the electro-magnet coil 104 the numeral wheel 103 will be advanced $\frac{1}{10}$ of a revolution.

Figure 8:
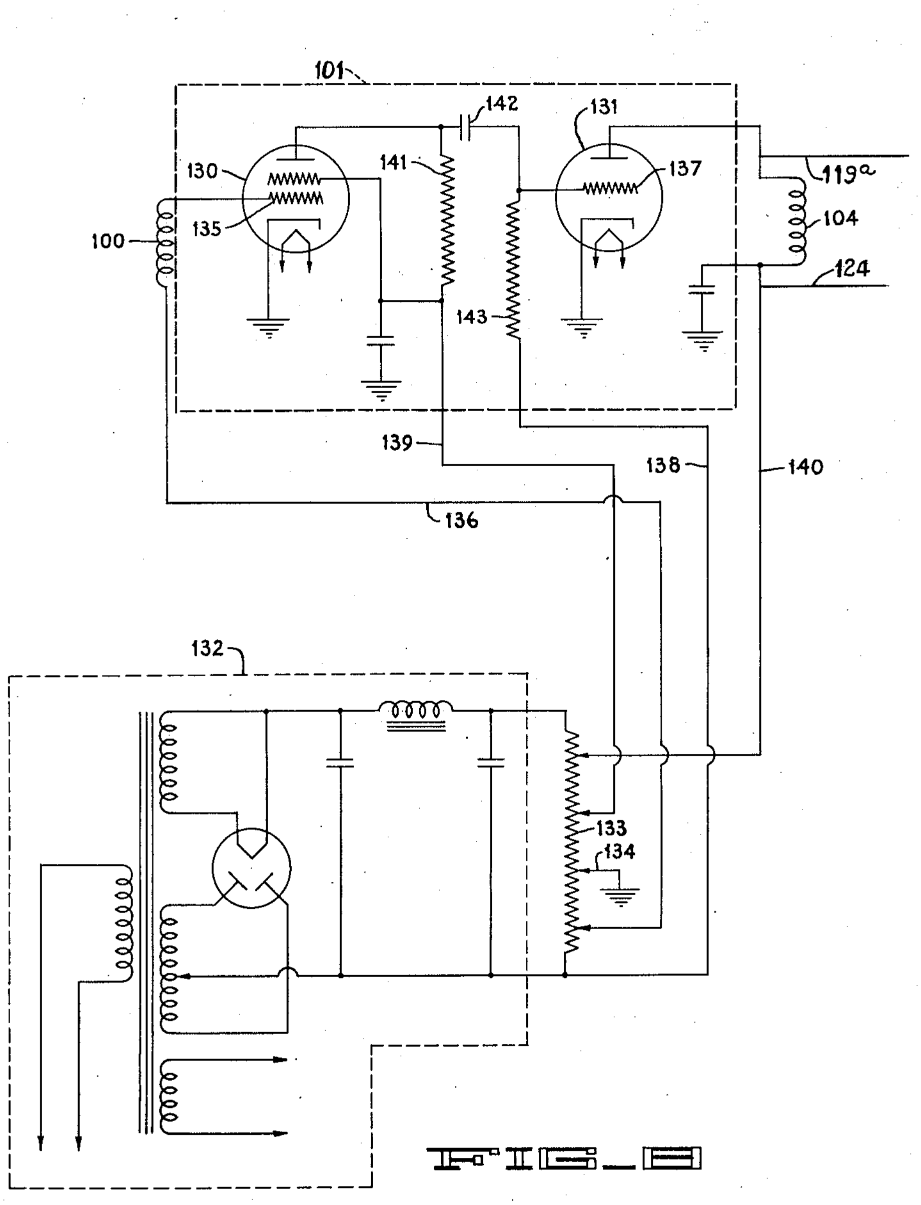
Figure 8 is a wiring diagram of one of the amplifiers.

Referring to Figure 8, an amplifier of conventional design suitable for amplifying the pulse received from the pick-up coils 100 will now be described. Vacuum tube 130 is of the high gain type and preferably should have a sharp cut-off. Connected to the vacuum tube 130 is a power amplifier tube 131. The power supply 132 supplies D. C. voltage to the voltage divider 133. The cathodes of both tubes are grounded and line 134 on the divider is grounded. The control grid 135 of tube 130 is connected to the divider by line 136 and is biased negatively to the plate current cut-off point. Also, the control grid 137 of tube 131 is negatively biased by being connected to the divider through line 138. Lines 139, 140 supply plate voltages to tubes 130, 131, respectively. Normally, neither tube passes plate current.

When current is induced in the pick-up coil 100 as previously described, the negative bias on the grid 135 is reduced and a pulse of plate current flows through the tube and through resistor 141. The resulting voltage pulse developed across resistor 141 is applied by means of condenser 142 and resistor 143 to the control grid 137 of tube 131 thereby reducing the negative bias and causing a large pulse of the plate current to flow in the tube 131. The coil of the electro-magnet 104 of the stepping device 102 is in the plate circuit of the amplifier tube 131.

The transfer mechanism will now be described. Referring to Figure 7, two orders of numeral wheels are shown with the means for transferring from one to the other. The numeral wheel 103 shown at the left end of the figure may be considered as being the tens order numeral wheel; and the other numeral wheel 103 shown in the Figure 7 may be considered as being the units order numeral wheel. The units order numeral wheel 103 has a tooth 109 secured thereto which, when the numeral wheel passes from 9 to 0, closes the switch 110. This switch closes the relay 111 in the following manner. One side of the switch 110 is connected by a line 112 to the power line and the other side is connected to the coil of the relay 111. The coil of the relay is also connected by a line 113 to a normally open switch 114, the other side of which is connected to the power line. Switch 114 is normally held open by the follower 17 of the cam 16 which, as shown, is in the full cycle position of the shaft 11. Upon rotation of the drum the switch 114 closes. Accordingly, if in the course of a revolution of the shaft the units order numeral wheel 103 passes from 9 to 0, its relay 111 will be energized. When the relay 111 is energized it closes a double pole switch, one pole 115 of which closes a circuit from the power supply through a line 116 to the coil thereby locking the relay in. The holding or locking circuit includes the closed switch 114, the conductor 113, the coil of the relay 111, the switch pole 115, and the conductor 116. The other pole 117 connects the power supply through a line 118 and a line 119 to a switch 120 which is connected by a conductor 119ª to the electro-magnet 104 associated with the tens order numeral wheel 103. There are a series of these switches 120 arranged in a row as indicated in Figure 1, each switch 120 being in circuit with a switch pole 117 associated with the registering mechanism of one order, and in circuit also with the electro-magnet 104 in the next higher order registering mechanism. The switches are adapted to be closed by protuberances 121 arranged in staggered relationship on the drum 122 which is rotated from shaft 11 in synchronism therewith by spur gears 123. The protuberances 121 are so arranged on the drum 122 that they do not begin closing the switches 120 until the end of the digitation phase of the cycle, thereafter the protuberances 121 close switches 120 one after the other beginning in the tens order and proceeding to the higher orders.

Assume, as before, that the switch 120 shown in Figure 7 is for the tens order. As just explained, if, during digitation, the numeral wheel 103 in the units order passed through 9 to 0 the relay 111 closed, then when the protuberance 121 associated with the tens transfer switch 120 encountered the same in the course of the revolution of the drum 122, then a circuit is completed to the electro-magnet 104, the other side of which is connected by a line 124 to the power supply. This causes the stepping device 102 to advance the tens order numeral wheel $\frac{1}{10}$ of a revolution. At the conclusion of the cycle the follower 17 drops into the dwell in the cam 16 opening the switch 114 thereby de-energizing relay 111. It is to be understood that one side of each of the relays 111 is to be connected to the line 113 so that in the full cycle position, opening of the switch 114 will de-energize any relays 111 which had been closed.

After the value set in the drum 10 has been entered in the accumulator and the transfer has been effected the operator releases the crank 21 in the full cycle position and depresses a key 125 which connects a doughnut coil 126 to a source of alternating current supply, indicated at 126ª in Figure 1. The coil 126 is fixed in position and is disposed as shown in Figure 1, concentric with the drum 10. The operator now rotates the pin wheel 18 to return the drum to the position shown in Figure 1 and as each magnetized tape 25 passes through the field of the A. C. coil its magnetization is wiped out. The operator then releases the key 125 and the machine is ready to have the next value set into it in the manner described above.

It will be evident that in this manner items set up on the keyboard can be entered into the accumulator where they are accumulated. It will also be apparent that multiplication could be performed with this machine by rotating the crank 21 a number of times corresponding to the units figure of the multiplier then shifting the drum over to the next higher ordinal position and rotating the crank a number of revolutions corresponding to the tens figure in the multiplier, etc.

What I claim is:

1. In a calculating machine, an accumulator, a series of ordinally-spaced pick-up coils, a series of ordinally-spaced magnetic record-receiving means, means mounting one of said series for adjustment relatively to the other of said series for selectively determining ordinal corelation between said coils and said record-receiving means, means for entering a figure in said series of magnetic record-receiving means by magnetizing said record-receiving means so that for each digit of the figure there are a corresponding number of magnetized points in the ordinally corresponding record-receiving means, means for causing relative movement between said coils and said record-receiving means so that in each order containing a magnetically-recorded number a corresponding number of pulses of current will be induced in the ordinally-related coil, and means responsive to pulses of current induced in said coils for registering the figure in said accumulator.

2. In a calculating machine, an accumulator, a series of ordinally-spaced pick-up coils, a series of ordinally-spaced magnetic record-receiving means mounted for rotation, means mounting one of said series for adjustment longitudinally of the axis of rotation of said record-receiving means and relatively to the other of said series for selectively determining ordinal corelation between said coils and said record-receiving means, means for recording a figure in said series of magnetic record-receiving means by magnetizing said record-receiving means so that for each digit of the figure there are a corresponding number of magnetized points in the ordinally corresponding record-receiving means, means for rotating said record-receiving means so that in each order containing a magnetically-recorded number a corresponding number of pulses of current will be induced in the ordinally-related coil for each revolution, and means responsive to pulses of current induced in said coils for registering the figure in said accumulator.

3. In a calculating machine, an accumulator, a series of ordinally-spaced pick-up coils, a series of ordinally-spaced magnetic record-receiving elements mounted for rotation in unison, means for ordinally shifting said record-receiving elements, means for recording a figure in said series of magnetic record-receiving elements by magnetizing said record-receiving elements so that for each digit of the figure there are a corresponding number of magnetized points in the ordinally corresponding record-receiving element, means for rotating said record-receiving elements so that in each order containing a magnetically-recorded number a corresponding number of pulses of current will be induced in the ordinally-related coil for each revolution, and means responsive to pulses of current induced in said coils for registering the figure in said accumulator.

4. In a calculating machine, an accumulator, a series of ordinally spaced pick-up coils, one for each order of said accumulator, means responsive to pulses of current induced in said coils for registering a figure in said accumulator, a member mounted for rotation and ordinal shifting having a series of ordinally spaced magnetic record-receiving elements thereon, means for ordinally shifting said member selectively to position said record-receiving elements in predetermined ordinal corelation to said pick-up coils, a plurality of electro-magnets, means for energizing a differential number of said electro-magnets, the electro-magnets so energized serving to magnetize a number of portions of the magnetic record-receiving element disposed in the field of said magnets corresponding to the number of electro-magnets energized, means for rotating said member when the record-receiving elements thereon are in predetermined ordinal corelation to said pick-up coils to cause the magnetized portions of each magnetized element to induce in the ordinally associated coil a number of pulses of current corresponding to the number of magnetized portions of the element for each revolution of said member.

5. In a calculating machine, an accumulator, a row of ordinally spaced pick-up coils, one for each order of said accumulator, means responsive to pulses of current induced in said coils for registering a figure in said accumulator, a member mounted for rotation and ordinal shifting having a plurality of ordinally spaced magnetic record-receiving elements thereon, a plurality of electro-magnets disposed at one end of said row of coils and arranged in an arc, the center of curvature of said arc being on the axis of rotation of said member, numeral keys and means controlled thereby for causing energization of a number of said electro-magnets corresponding to the number of the key depressed, means for ordinally shifting said member to successively position said elements in the field of said electro-magnets, the element disposed in the field at the time a key is depressed having a number of portions thereof magnetized corresponding to the number of the key depressed, said shifting means also serving to ordinally position said recording elements with respect to said coils, and means for rotating said member.

6. In a device of the character described, a plurality of numeral keys, a plurality of electro-magnets, a source of power, means for selectively energizing a number of said electro-magnets corresponding to the number of the key depressed comprising means to connect said electro-magnets in parallel, a normally closed switch in the circuit of each electro-magnet except the first, the number one key serving to open the switch of the number two electro-magnet, the number two key serving to open the switch of the number three electro-magnet, and so on, said switches being connected in series, a normally open switch between the power supply and the electro-magnets, and means operated by depression of any key for closing said switch.

7. In a calculating machine, an accumulator having a plurality of numeral wheels, electrical means for actuating each of said numeral wheels including a pick-up coil, said pick-up coils being ordinally arranged, a rotatable member having a plurality of ordinally arranged magnetic record-receiving elements thereon, means for differentially magnetizing said elements including a keyboard, and a plurality of electro-magnets controlled thereby, means for shifting said rotatable member to bring said magnetic record-receiving elements successively into the field of said electro-magnets and to corelate said record-receiving elements ordinally with said coils, means for rotating said member after a value has been recorded thereon and corelated with said coils for causing the magnetized elements to induce pulses of current in said pick-up coils, an erasing coil, and means to supply said erasing coil with alternating current, said erasing coil being disposed so that by shifting the rotatable member back to its original position said record-receiving elements will be passed therethrough.

8. In a calculating machine, an accumulator including ordinally arranged mechanisms, ordinally arranged electrically operated means for respectively actuating said mechanisms, means to supply current to said actuating means including ordinally arranged pick-up coils, a plural order record-receiving member for inducing current in said coils, means to move said record-receiving member in a first direction relative to said coils so that from time to time various orders of such record-receiving member may be aligned with various orders of said coils, and means to move said record-receiving member in a second direction so that all such orders of said record-receiving member as may be aligned at a time with pick-up coils will be passed by such aligned coils to induce current therein and in said actuating means to render said actuating means operative to actuate said accumulator mechanisms and accumulator.

9. In a calculating machine, an accumulator comprising a row of numeral wheels, ordinally arranged magnets for respectively actuating said numeral wheels; means to supply current to said magnets including a plurality of pick-up coils, plural order record-receiving member for inducing current in said coils, means to move said record-receiving member in a first direction relative to said coils so that from time to time various orders of such record-receiving member may be aligned with various orders of said coils, and means to move said record-receiving member in a second direction so that all such orders of said record-receiving member as may be aligned at a time with pick-up coils will be passed by such aligned coils to induce current therein and in said means to supply current to render said magnets operative to actuate said numeral wheels.

10. In a calculating machine, an accumulator, a series of ordinally-spaced pick-up coils, a plural order magnetic record-receiving means mounted for rotation with respect to said coils, means for ordinally shifting said record-receiving means with respect to said coils, means for recording a figure in said record-receiving means by magnetizing said record-receiving means so that for each digit of the figure there are a corresponding number of magnetized points in the ordinally corresponding portion of the record-receiving means, means for rotating said record-receiving means so that in each order thereof containing a magnetically-recorded number a corresponding number of pulses of current will be induced in the ordinally-related coil for each revolution, and means responsive to pulses of current induced in said coils for registering the figure in said accumulator.

11. In a calculating machine, an accumulator, a series of ordinally spaced pick-up coils, one for each order of said accumulator, means responsive to pulses of current induced in said coils for registering a figure in said accumulator, a magnetic record-receiving means mounted for rotation and ordinal shifting with respect to said coils, a plurality of annularly arranged electro-magnets, mechanism for ordinally shifting said record-receiving means selectively to position said record-receiving means in predetermined ordinal corelation to said pick-up coils or said electro-magnets, means for energizing a differential number of said electro-magnets, the electro-magnets so energized serving to magnetize a number of portions of the record-receiving means disposed in the fields of said magnets and corresponding to the number of electro-magnets energized, means for rotating said record-receiving means when the magnetized portions thereof are in predetermined ordinal corelation to said pick-up coils to cause said magnetized portions to induce in the ordinally associated coils a number of pulses of current corresponding to the number of magnetized portions of said record-receiving means for each revolution of said record receiving means.

12. In a calculating machine, an accumulator having a plurality of numeral wheels, electrical means for actuating each of said numeral wheels including a pick-up coil, said pick-up coils being ordinally arranged, a rotatable plural order magnetic record-receiving member adapted to be magnetized locally at a plurality of ordinally and peripherally spaced points, means for differentially magnetizing said member at a plurality of ordinally and peripherally spaced points including a keyboard and a plurality of electro-magnets controlled thereby, means for shifting said member to bring each order of said member successively into the field of said electro-magnets and to corelate said member ordinally with said coils, means for rotating said member after it has been magnetized at a plurality of ordinally and peripherally spaced points in accordance with a value set in said keyboard for causing the magnetized points to induce pulses of current in said pick-up coils, and means for erasing said magnetic points by shifting of said member.

13. In a calculating machine, a register comprising a row of numeral wheels, a plurality of ordinally arranged magnets for respectively actuating said numeral wheels, means to supply current to said magnets including a plurality of pick-up coils, a plural order magnetic record-receiving means adapted to be magnetized locally at a plurality of ordinally and peripherally spaced points, means for magnetizing said record-receiving means locally at a plurality of ordinally and peripherally spaced points in accordance with a value to be entered in said register, means selectively operable for variably determining ordinal corelation between said record-receiving means and said coils and for variably determining ordinal corelation between each of certain of said ordinally spaced points and selected different ones of a plurality of said coils, and means for differentially rendering said record-receiving means operative for inducing current in the ordinally related coils.

14. In a calculating machine; an accumulator having a plurality of numeral wheels; electrical means for actuating said numeral wheels including a pick-up coil for each wheel; said pick-up coils being ordinally arranged; a plural order record-receiving member adapted to receive ordinally and digitally arranged magnetic points; means for magnetizing each order of said magnetic record-receiving member to establish such points including a keyboard and a plurality of digital electromagnets controlled thereby; means for ordinally shifting said record-receiving means to bring each order of said member successively into the fields of said electro-magnets and to corelate said member ordinally with said pick-up coils, and means for shifting said record-receiving member digitally with respect to said pick-up coils after a value has been recorded in said member, for causing the magnetic points to induce pulses of current in said pick-up coils and electrical means to actuate said wheels in accordance with such pulses; and means for erasing said magnetic points.

15. In a calculating machine, an accumulator including ordinally arranged mechanisms, ordinally arranged electrically operated means for respectively actuating said mechanisms, means to supply current to said actuating means including ordinally arranged pick-up coils, a plural order record-receiving member adapted to receive ordinally and digitally arranged magnetic points for inducing current in said coils, means to move said record-receiving member in a first direction relative to said coils so that from time to time various orders of such record-receiving member may be aligned with various orders of said coils, and means to move said record-receiving member in a second direction so that all such orders of said record-receiving member as may be aligned at a time with pick-up coils will be digitally passed by such aligned coils to induce current therein and in said actuating means to render said actuating means operative to actuate said accumulator mechanisms and accumulator.

16. In a calculating machine, an accumulator including ordinally arranged mechanisms, ordinally arranged electrically operated means for respectively actuating said mechanisms, means to supply current to said actuating means including ordinally arranged pick-up coils, a plural order record-receiving member adapted to receive ordinally and digitally arranged magnetic points for inducing currents in said coils, means to move said record-receiving member in a first direction relative to said coils so that the higher orders of said member will first align with the lower orders of said coils and later with higher orders of said coils, and means to move said record-receiving member in a second direction so that all such orders of said record-receiving member as may be aligned at a time with pick-up coils will be digitally passed by such aligned coils to induce current therein and in said actuating means to render said actuating means operative to actuate said mechanisms and accumulator.

GEORGE W. HOPKINS.

REFERENCES CITED

The following references are of record in the file of this patent:

UNITED STATES PATENTS

| Number | Name | Date |
|---|---|---|
| 1,880,523 | Tauschek | Oct. 4, 1932 |
| 2,080,100 | Tauschek | May 11, 1937 |
| 2,108,596 | Rudin | Feb. 15, 1938 |
| 2,150,227 | Lake et al. | Mar. 14, 1939 |
| 2,156,969 | Bryce | May 2, 1939 |
| 2,176,932 | Smith | Oct. 24, 1939 |
| 2,254,933 | Bryce | Sept. 2, 1941 |
| 2,302,001 | Bryce | Nov. 2, 1942 |

FOREIGN PATENTS

| Number | Country | Date |
|---|---|---|
| 244,013 | Germany | June 3, 1909 |
| 372,742 | Great Britain | May 2, 1932 |